US011116017B2

(12) United States Patent
Khanduri

(10) Patent No.: US 11,116,017 B2
(45) Date of Patent: Sep. 7, 2021

(54) SYSTEMS AND METHODS FOR SERVICE ENABLEMENT AND END DEVICE ACTIVATION

(71) Applicant: Verizon Patent and Licensing Inc., Arlington, VA (US)

(72) Inventor: Prakash C. Khanduri, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 120 days.

(21) Appl. No.: 16/690,442

(22) Filed: Nov. 21, 2019

(65) Prior Publication Data

US 2021/0160937 A1 May 27, 2021

(51) Int. Cl.
*H04W 76/11* (2018.01)
*H04W 8/28* (2009.01)
*H04W 8/00* (2009.01)
*H04B 17/318* (2015.01)
*H04Q 3/00* (2006.01)
*H04W 4/80* (2018.01)
*G06F 21/32* (2013.01)
*H04W 12/43* (2021.01)
*H04W 12/72* (2021.01)

(52) U.S. Cl.
CPC ............ *H04W 76/11* (2018.02); *G06F 21/32* (2013.01); *H04B 17/318* (2015.01); *H04Q 3/005* (2013.01); *H04W 4/80* (2018.02); *H04W 8/005* (2013.01); *H04W 8/28* (2013.01); *H04W 12/43* (2021.01); *H04W 12/72* (2021.01)

(58) Field of Classification Search
CPC ....... H04W 76/11; H04W 4/80; H04W 12/72; H04W 12/43; H04W 8/005; H04W 8/28; H04B 17/318; G06F 21/32; H04Q 3/005
See application file for complete search history.

(56) References Cited

U.S. PATENT DOCUMENTS

2015/0281362 A1* 10/2015 Shanmugam ........... H04L 67/12
    709/217
2015/0381826 A1* 12/2015 Marimuthu ........... H04W 24/10
    455/405
2017/0163802 A1* 6/2017 Cuadrat ............ H04M 3/42272

* cited by examiner

*Primary Examiner* — Duc C Ho

(57) ABSTRACT

A method, device, and computer-readable medium provide for identifying a user of a first end device based on first user identification information; registering the first end device in a provider network based on first user credentials, the first end device having a SIM profile associated with an MDN; generating a network session ID to access a first application service from the server device via a first network connection; initiating a first pairing mode with a second end device; identifying the user based on second user identification information obtained from the user via the second end device; determining that the second end device has a higher hosting priority than the first end device; sending a request to the server device to transfer use of the MDN to the second end device; and establishing a second network connection to the server device and releasing the first network connection based on the transfer.

20 Claims, 6 Drawing Sheets

500

| SERVICE PLAN XYZ | | |
|---|---|---|
| DEVICE ID 510 | LOCATION 520 | PRIORITY 530 |
| SMART WATCH | HOME | -- |
| SMART PHONE | HOME | 3 |
| PC | HOME | 1 |
| LAPTOP | HOME | 2 |
| TABLET | HOME | 4 |
| PHABLET | HOME | 5 |
| LANDLINE PHONE | HOME | 6 |
| SET TOP BOX | HOME | 7 |
| PDA | HOME | 8 |
| VEHICLE | HOME | -- |
| VEHICLE | MOBILE | 1 |

SYSTEMS AND METHODS FOR SERVICE ENABLEMENT AND END DEVICE ACTIVATION

BACKGROUND INFORMATION

According to market research, the average consumer will soon have around 13 user devices at his or her disposal. Today's user devices feature endpoint applications that provide an ever-increasing variety of services that continue to improve the user experience. These applications typically communicate with network applications hosted by service provider networks and/or other networks (e.g., the Internet), to enable an array of services and/or information for providing multiple endpoint interfaces.

Establishing the individual network sessions for accessing integrated services, however, is complex due to varied login procedures and/or authentication credentials required for each of the service provider applications. For example, on average, users maintain approximately 25 passwords/user IDs for various purposes. Also, network performance is not optimized because each of the user devices requires its own network connection. Furthermore, because static session IDs are generated based on a device's phone number and a simple key sequence input, the user of the device is not necessarily known or authenticated by the service provider networks/applications providing the application service. Consequently, service provider networks and/or the service provider applications may be subject to unauthorized access by an authenticated user device with an unidentified user.

DETAILED DESCRIPTION OF PREFERRED EMBODIMENTS

Figure 1:
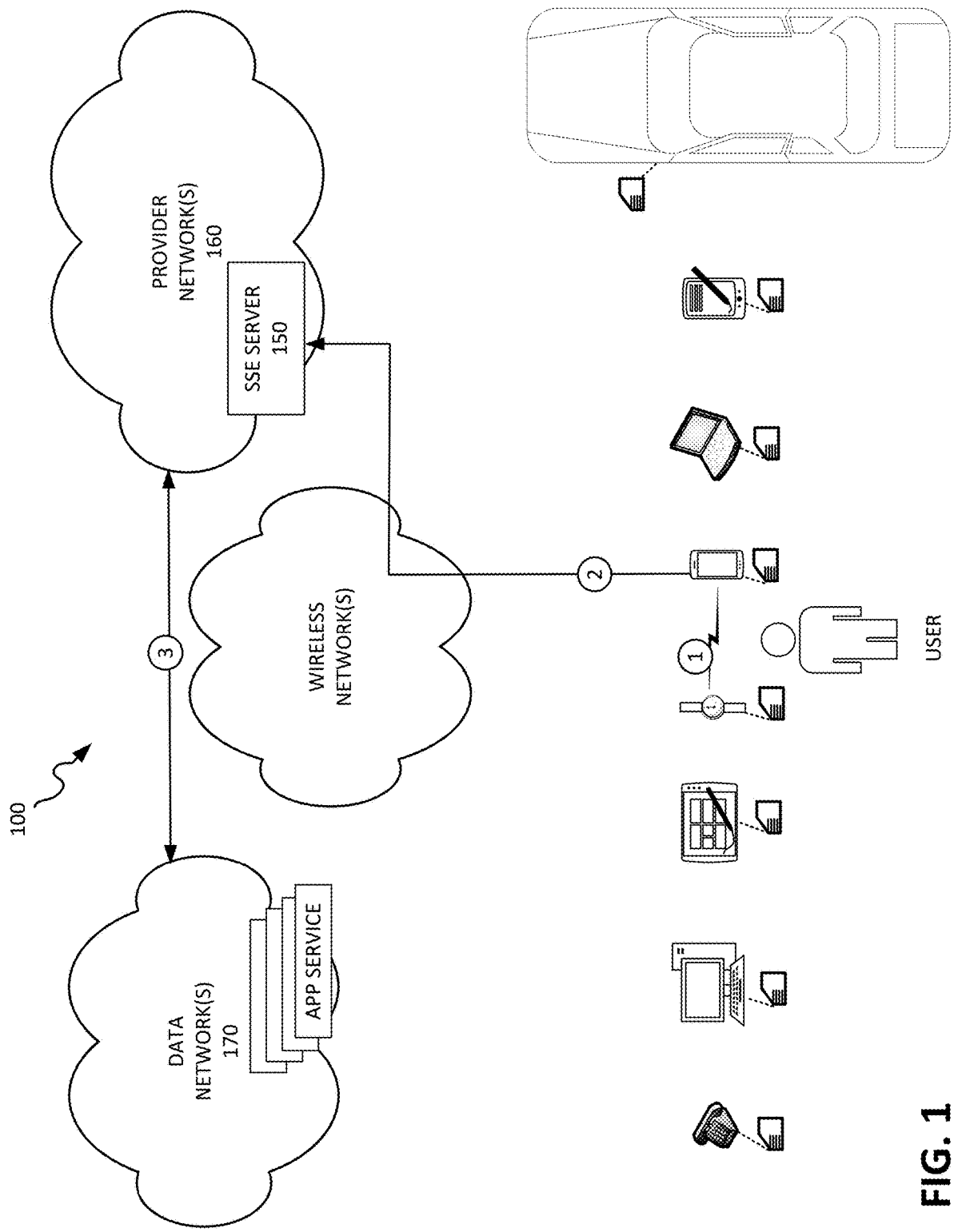
FIG. 1 is a diagram that illustrates an overview of seamless service enablement and end device activation in an endpoint interface scenario described herein.

The following detailed description refers to the accompanying drawings. The same reference numbers in different drawings may identify the same or similar elements. Also, the following detailed description does not limit the invention, which is defined by the claims.

An implementation described herein may include systems and/or methods that provide for dynamic session management and seamless device activation in an application service interface scenario. As described herein, the dynamic session management implementation may use a seamless service enablement (SSE) system to perform an operation using a single mobile directory number (MDN) to activate M number of user devices (or end devices) and enable N number of applications and/or services (referred to as "application services"). The "smart client," as described herein, may be an application that resides on a user device associated with a particular user. As described herein, the SSE system may provide security key management, subscriber identity module (SIM) management and/or service management, in communication with a smart client on a user device associated with the MDN.

The SSE system, as described herein, may enable application services that originate from a provider network(s) (e.g., a core network) and are received by and presented to a user of a user device as an endpoint interface for a particular MDN. For example, a smart client of a user device may request to receive a particular service (e.g., on behalf of an identified user) from a provider network with which an SSE server is associated. Additionally, the smart client may request to transfer the MDN to another user device of the user at the user location. In one example, a smart client may enable an identified user to use any number of SIM-based user devices that are proximate to and paired with a "host" user device assigned the MDN. The smart clients of the user devices may negotiate a hosting priority order of the user devices at a particular location based on, for example, a routing priority table.

In one exemplary implementation, the smart device may perform an operation to register a user device to a network. For example, the smart device may generate a dynamic network session ID based on login credentials, according to an applicable service plan between the provider network and the user. The duration of the network session may be based on the type of application service and the particular interface scenario. The SSE system may verify the identity of a user of a user device based on identify information and/or login credentials associated with the identified user, for each network session.

In another exemplary implementation, the smart device may provide user authentication and/or identification services for paired user devices at a location. For example, the paired mode may be initiated by the smart client verifying an identity of the user with respect to each of the user devices requesting an application service. The authentication/identification may include an exchange of identity information (e.g., such as a token) that contains information associated with the user, the user device, an application associated with the user device, etc. In one embodiment, the SSE system may receive the access request and may use the token to obtain other identity information (e.g., from an SSE database), permission information (e.g., associated with an application that provides an application service), policy information (e.g., associated with a service provider network), and/or context information (e.g., associated with the user device) that may be used to verify the identity of the user.

FIG. 1 is a diagram that illustrates an overview of an SSE implementation 100 in an endpoint interface scenario described herein. As illustrated in FIG. 1, a data network 170 (e.g., Internet) may host multiple application services (e.g., telecommunications, travel-related, vehicle, consumer, healthcare, entertainment, secure ID, financial services, etc.) that may provide an endpoint interface to a user (e.g., shown as "user") of multiple user devices, known to an SSE server hosted on the provider network 160 (e.g., Internet service provider (ISP) network). For example, the user may, under a service plan with the ISP, register one or more of the user devices to the network via a single network connection using a single MDN. Each of the user devices may be enabled with a SIM card and/or an electronic SIM (eSIM) and embedded Secure Element (eSE). The user devices may be configured for number sharing under the service plan.

The application service may, for example, provide an endpoint interface (e.g., for a travel service) to one or more of the user devices based on one or multiple integrated services (e.g., a "composite service" including a transportation service, a lodging service, and/or other services). The transportation service may, for example, be obtained from a service provider application (e.g., a ground transportation application, a flight reservation application, a navigation application, etc.) that is hosted by one or more application servers associated with a service provider. The lodging service may, for example, be obtained from another application service provider application (e.g., a hotel reservation application) that is hosted by an application server associated with another service provider.

Assume, in this example, that the user desires to use an endpoint interface (e.g., a smartwatch, a cell phone, a phablet, a laptop, a PC, a tablet, a wireline phone, a vehicle's telecommunication unit (TCU), etc.) to book, check-in, and access travel-related services. Assume further that the user desires to use a credit card service to enable an endpoint interface for cashless transactions during travel. Assume still further that the user desires to enable an endpoint interface for a user ID verification service to provide official ID information for accessing secured facilities, customs, pre-check security, keyless entry, etc.

As shown in FIG. 1, for example, the user may be using a wearable device (e.g., a smartwatch), at a location such as his home or office. The smartwatch may detect the presence of another user device (e.g., smart phone) when the two are in proximity (e.g., within a pairing range) and/or powered on. The smart client in the smartwatch and the smart client in the smart phone may automatically initiate a paring mode. As one example, the devices may establish a secure short-range communication link, such as WiFi, Bluetooth®, near field communication (NFC), etc., as indication 1 in FIG. 1.

Once paired, the smart clients may negotiate a hosting priority, for example, based on a priority routing table. In one example, hosting priority may be determined based on attributes such as processor power, device type, the use location, modem speed, paired-mode signal strength, etc. The smart clients may obtain and exchange user identification and authentication information for each user device. As one example, a user may provide login credentials by entering the login credentials via a keypad/keyboard, a touch screen, a biometric device, and/or some other device associated with the user device. The biometric device may include a device (e.g., a camera, a laser scanner, a microphone, etc.) that may receive multi-modal biometric information associated with a user (e.g., retina scans, a voiceprint, a facial signature, fingerprints, etc.). Similar device pairing, user authentication, and hosting priority determination may occur with any number of SIM- or eSIM with eSE-based user devices (e.g., a telephone, a PC, a phablet, a laptop, a tablet, a vehicle, etc.) at the location.

As also shown in FIG. 1, for example, the host user device's smart client may generate a dynamic network session ID and send, as indication 2, the network session ID to an SSE server 150, for example, via wireless network (e.g., radio access network (RAN). In one example, the network session ID may verify the identity of the user and register the host user device to the network using a single MDN to the host user device under the service plan. The network session ID may include all or a portion of the login credentials (e.g., a token) and identify the paired (or "companion") user devices (i.e., non-host user devices).

SSE server 150 may receive the network session ID associated with the user (e.g., the token) and SSE server 150 may register the host user device and/or each of the companion user devices under a service plan. Additionally, or alternatively, SSE server 150 may, for example, use the network session ID to retrieve, from a database, identity information associated with the user (e.g., information associated with names, addresses, applications with which the user is associated, and/or login credentials associated with the applications with which the user is associated, etc.). In another example, SSE server 150 may retrieve permission and/or policy information associated with the service provider network and/or with application services. For example, SSE server 150 may determine whether the service provider network permits the use an application service by the user at a given location.

In yet another example, SSE server 150 may retrieve context information associated with the MDN and/or the host user device. In one example, the context information may include a location associated with the user device from which the user device, at a prior point in time, has accessed the application service and/or other application services from which requested application services were obtained. SSE server 150 may compare the retrieved context information with the context information associated with a current network session (e.g., received via the token) to determine which application services to activate under the service plan. In yet another example, SSE server 150 may query the host user device to obtain additional identity information and/or login credentials manage the corresponding SIM profile of the user device and/or to authorize access to a requested application service based policy and/or permission information, and/or context information. As further shown in FIG. 1, SSE server 150 may provide access, as indication 3, to one or more requested application services hosted by service providers in a data network (i.e., the Internet).

Figure 2:
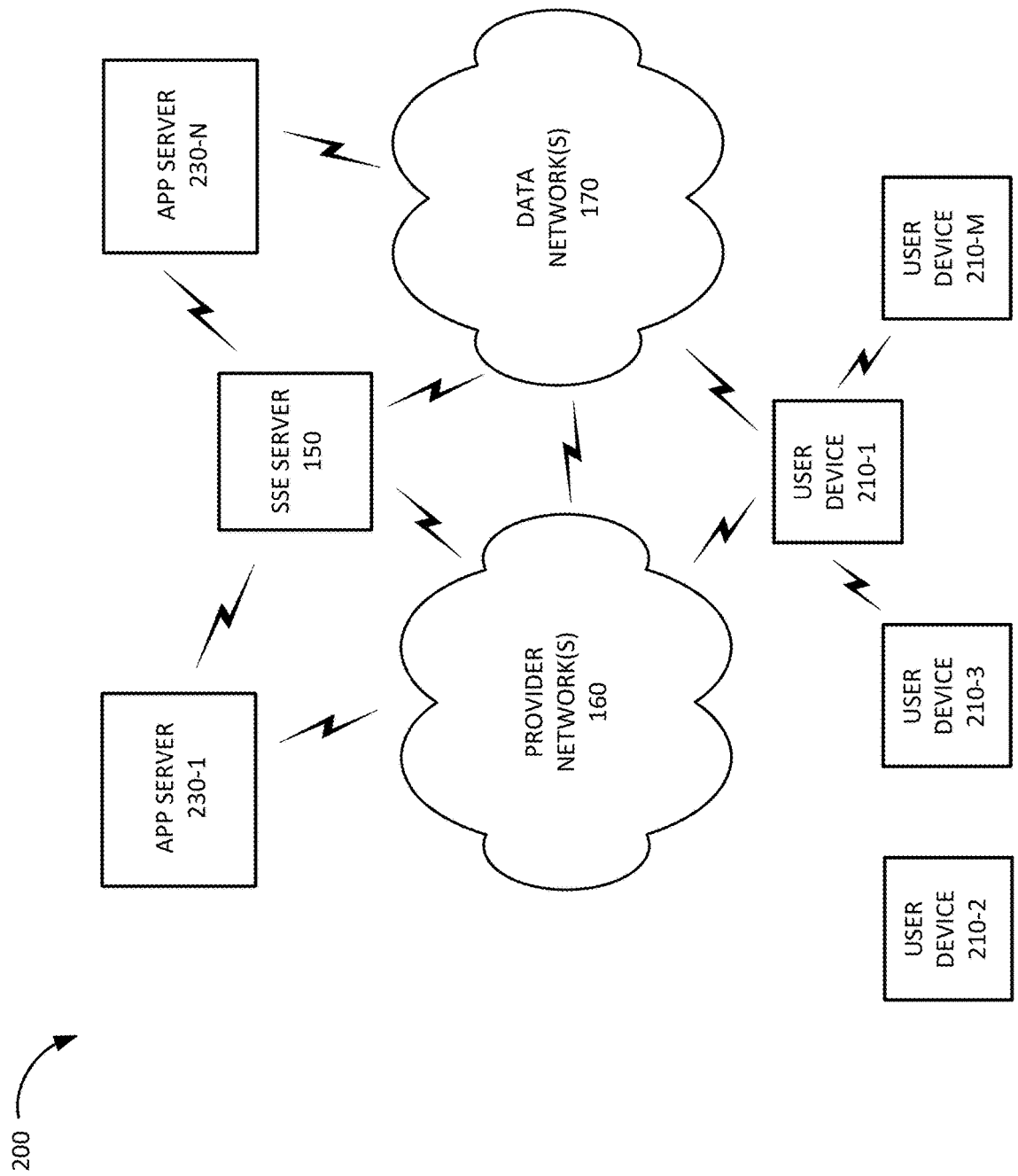
FIG. 2 is a diagram of an exemplary network in which systems and/or methods described herein may be implemented.

FIG. 2 is a diagram of an exemplary network 200 in which systems and/or methods described herein may be implemented. As shown in FIG. 2, network 200 may include a group of user devices 210-1 through 210-M (M≥1) (hereinafter referred to collectively as "user devices 210" and individually as a "user device 210" or "user device 210-x"), multiple application servers 230-1 through 230-N (N≥1) (hereinafter referred to collectively as "application servers 230" and individually as an "application server 230"), an SSE server 150, a provider network 160, and a data network 170. The number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2.

Also, in some implementations, one or more of the devices of network 200 may perform one or more functions described as being performed by another one or more of the devices of network 200. Devices of network 200 may interconnect via wired connections, wireless connections, optical connection or a combination of wired and wireless connections.

User device 210 may include any computation or communication device, such as a wireless mobile communication device that is capable of communicating via service provider network 160 and/or data network 170. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a landline telephone, a laptop computer, a tablet computer, a phablet, a wearable device (e.g., a health monitoring device), a personal computer (PC), a set top box (STB), a television, a camera, a gaming system, a navigation system, an Internet of Things (IoT) device, or another type of computation or communication device. The description to follow will generally refer to user device 210 as a user device that is a SIM-based or eSIM with eSE-based device, and capable of phone number sharing. The description is not limited, however, to a wireless mobile device and may equally apply to other types of user devices. User devices 210 may be voice-enabled (e.g., VoLTE) or not voice-enabled (e.g., non-VoLTE).

User device 210-1 may obtain services from and/or be a subscriber to provider network 160. For example, user device 210-1 may communicate with application server 230-1 and/or with application server 230-N (e.g., via a RAN (not shown)) to establish permissions associated with a requested application service. In one example, a user of user device 210-1 may communicate with an application service (e.g., associated with a travel-related service) that is hosted by application (App) server 230-1 and may authorize access by other user devices 210 via the network connection of user device 210-1.

User device 210-M may use a smart client (e.g., an application or artificial intelligence (AI)) to obtain services. For example, user device 210-M may communicate with user device 210-1 via a short-range communication link. User device 210-M may, for example, pair with user device 210-1 (e.g., to receive application services) using login credentials as described above in FIG. 1 (e.g., via multi-modal biometrics associated with the user). The smart clients of user device 210-1 and user device 210-M may negotiate a hosting priority with respect to network communications, for example, based on a routing table.

The smart client of user device 210-1 may, in pairing mode, detect a presence and/or a power-up of user device 210-M at a same general location. The smart client of user device 210-1 may determine a signal strength (e.g., a Reference Signal Received Power (RSRP) value, a Reference Signal Received Quality (RSRQ) value, a Received Signal Strength Indication (RSSI) value, a signal-to-interference-plus-noise ratio (SINR) value, a signal to noise ratio (SNR) value, a block error rate (BLER) value, an amplifier gain setting value, a channel state information (CSI) report (including, e.g., Channel Quality Indicator (CQI), Precoding Matrix Indicator (PMI), Rank Indicator (RI), etc.), and/or another type of signal characteristic value) associated with the short-range communication link, and compare the measured value to a threshold value. Based on results of the comparison, the pairing mode may be initiated. For example, each of user devices 210-3 and user device 210-M may be paired to user device 210-1, while user device 210-2 may not be paired with user device 210-1 even though located at the same general location and in proximity to user device 210-1 because of insufficient signal strength. In this case, user device 210-2 may be enabled to establish its own network connection to provider network 160 and/or data network 170.

Application server 230 may include one or more server devices, or other types of computation or communication devices, that gather, process, search, store, and/or provide information in a manner similar to that described herein. For example, application server 230 may host application services that may be used by user device 210-1 under a service plan. In one example, application server 230 may receive the request for an application service and may query SSE server 150 to verify the identity of the user and/or user device 210-1. The query may be performed, for example, when an application service, hosted by application server 230, provides a service under a service plan. Application server 230 may obtain information associated with another user device 210-M. For example, application server 230 may communicate with user device 210-1 to obtain identity information to be used to provide an application service hosted by application server 230-M to user device 210-M.

SSE server 150 may include one or more server devices, or other types of computation or communication devices, that gather, process, search, store, and/or provide information in a manner similar to that described herein. For example, SSE server 150 may execute an SSE application that performs an SSE operation to assign an MDN to host user device 210-1 and transfer (or use of the MDN) the MDN to another user device 210-N when directed by host user device 210-1. In another example, SSE server 150 may authorize the access to application server 230, on behalf of the user.

Provider network 160 may include one or more wired and/or wireless networks via which SSE services are provided. For example, service provider network 160 may include a cellular network, the Public Land Mobile Network (PLMN), a second generation (2G) network, a third generation (3G) network, a fourth generation (4G) network, a fifth generation (5G) public or private network, and/or another network. Additionally, or alternatively, provider network 160 may include a wide area network (WAN), a metropolitan area network (MAN), an ad hoc network, an intranet, a fiber optic-based network (e.g., a fiber optic service network), and/or a combination of these or other types of networks.

Data network 170 may include one or more wired and/or wireless networks. For example, data network 170 may include a cellular network, the PLMN, a 2G network, a 3G network, a 4G network, a 5G network, and/or another network. Additionally, or alternatively, data network 170 may include a WAN, a MAN, a telephone network (e.g., the Public Switched Telephone Network (PSTN)), an ad hoc network, an intranet, the Internet, a fiber optic-based network (e.g., a FiOS network), and/or a combination of these or other types of networks.

Figure 3:
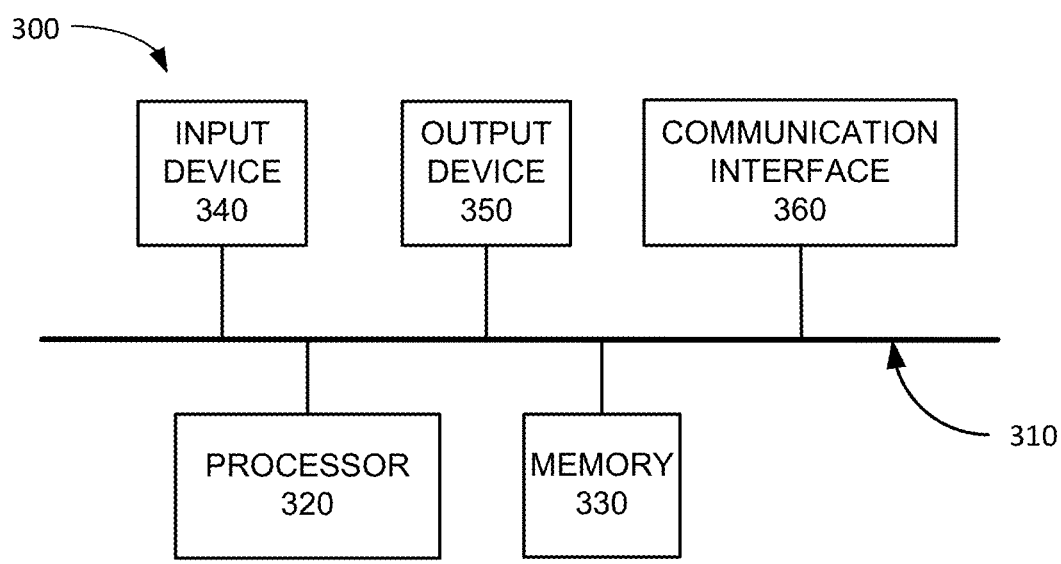
FIG. 3 is a diagram of exemplary components of one or more of the devices of FIG. 2.

FIG. 3 is a diagram of example components of a device 300. Device 300 may correspond to user device 210, application server 230, and/or SSE server 150. Device 300 may include a bus 310, a processor 320, a memory 330, an input device 340, an output device 350, and a communication interface 360. Although FIG. 3 shows exemplary components of device 300, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input device 340 may include a mechanism that permits a user to input information to device 300, such as a keyboard, a keypad, a button, a switch, a microphone, a camera, a fingerprint reader, etc. Output device 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as provider network 160 and/or data network 170.

As will be described in detail below, device 300 may perform certain operations relating to SSE services associated with corresponding endpoint interfaces. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4A:
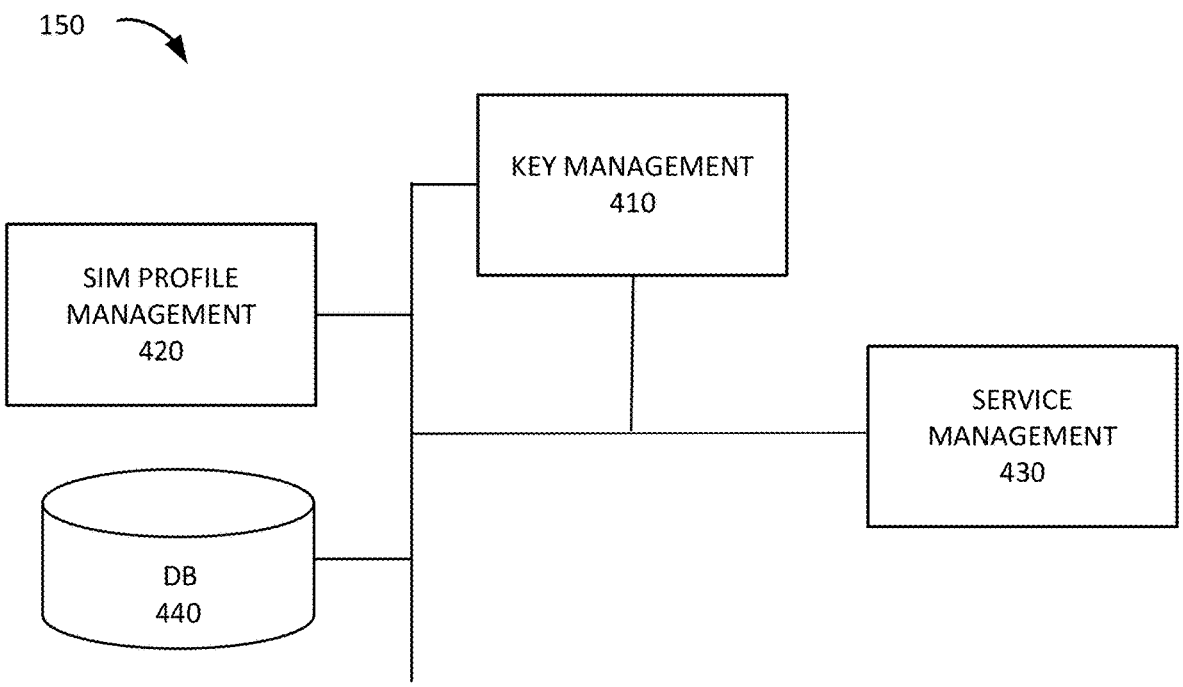
FIG. 4A is a diagram showing exemplary components of a seamless service enablement server.

FIG. 4A is a diagram of exemplary components of SSE server 150. The components of SSE server 150 may be implemented, for example, via processor 320 executing instructions from memory 330. Alternatively, some or all of the functional components of SSE server 150 may be implemented via hard-wired circuitry. As shown in FIG. 4A, SSE server 150 may include a key management 410 device, a SIM profile management 420 device, a service management 430 device, and a database (DB) 440.

Key management 410 device may provide secure key management for network sessions associated with requests for application services from user device 210-M. For example, SSE server 150 may include a lite Trusted Service Manager (Lite TSM) server that verifies the identity of and/or authentication information associated with user device 210-M. In response to a request, the SSE application may retrieve information associated with the user and/or with user device 210-M from database 440. Information associated with the user may include information associated with a business identity (e.g., usernames, passwords, business address, particular service provider applications, etc.); a personal identity (e.g., usernames, passwords, personal identification numbers (PINs), home address, home telephone, other service provider applications, etc.), and/or other identities, such as an obfuscated and/or anonymous identity (e.g., a username, password, Internet protocol (IP) multimedia subsystem (IMS) public user identity, etc.).

SIM management 420 may perform SIM/eSIM profile management using information associated with user device 210-M, such as device identifiers, such as a mobile directory number (MDN), a landline directory number (LDN), an international mobile subscriber identity (IMSI), an international mobile equipment identity (IMEI), an electronic serial number (ESN), a mobile identification number (MIN), a mobile subscriber integrated services digital network (MSISDN) number, a national access identifier (NAI), a media access control (MAC) address, an IP address, a uniform resource locator (URL), an encoder-decoder (CODEC) number, an STB identifier, integrated circuit card ID (ICCID), etc. For example, SIM management 420 may include a remote SIM provisioning system such as Subscription Manager-Data Preparation enhanced (SMDP+).

Service management 430 device may determine whether policy and/or permission information authorizes access to application services by user device 210-M. SSE server 150 may, for example, retrieve policy information, associated with provider network 160, from database 440 to determine whether the policy information permits SSE server 150 to send authorization information and/or a request to application server 230-N. Additionally, or alternatively, service management 430 device may determine whether and/or under what conditions the MDN should be transferred to a companion user device 210-M based on a request received from a host user device 210-1. Database 440 may be any storage device that permanently and/or temporarily stores data in any number of formats which may be retrieved and/or updated.

Although FIG. 4A shows exemplary components of SSE server 150, in other implementations, SSE server 150 may include fewer components, different components, differently arranged components, or additional components than depicted in FIG. 4A. Additionally, or alternatively, one or more components of SSE server 150 may perform functions described as being performed by one or more other components of SSE server 150.

Figure 4B:
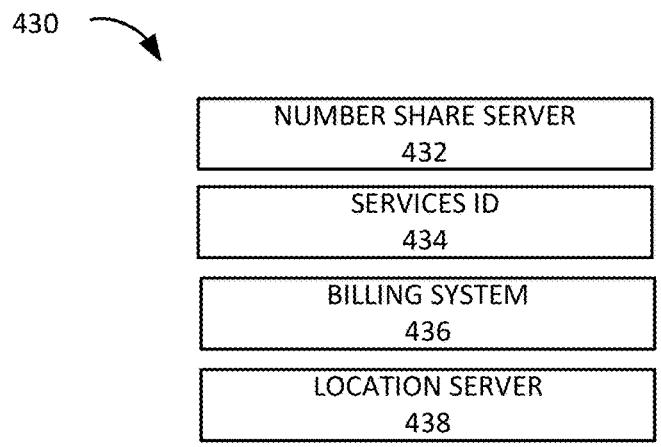
FIG. 4B is a diagram showing exemplary components of a service management system.

FIG. 4B is a diagram of exemplary components of service management 430. The components of service management 430 device may be implemented, for example, via processor 320 executing instructions from memory 330. Alternatively, some or all of the components of service management 430 device may be implemented via hard-wired circuitry. As shown in FIG. 4B, service management 430 may include a number share server 432, a services identifier (ID) 434, a billing system 436, and a location server 438.

Number share server 432 may determine and control which paired user devices 210-2 through 210-M are to share a phone number with host user device 210-1. In one example, paired user devices 210-X do not need to have their own assigned telephone number. In another example, paired user devices 210-X that are designated for number sharing may be non-VoLTE devices or data devices. Number share server 432 may configure paired user devices 210-X to receive an incoming call notification only when in proximity to host user device 210-1. In one implementation, an unlimited number of paired user devices 210-X may be configured for sharing a number.

Services ID 434 may identify application services and/or corresponding host servers that are available under a service plan. Information from services ID 434 may be used by other components to grant authorization to user devices 210-X. Billing system 436 may implement, for example, terms of usage under a service plan for the user and generate billing information based on information obtained from other components regarding access of application services by any of user devices 210-X. In one embodiment, billing system 436 may include a policy and charging rules function (PRCF) to perform some or all billing-related functions. Location server 438 may use, for example, global positioning system (GPS) information to determine a current location of user devices 210-MX The current location information may be used by other components, such as services ID 434, to determine what application services are available to user devices 210-X at the particular location under the applicable service plan.

Figure 5:
FIG. 5 is a diagram of an example end device host priority routing data structure.
Figure 5:

FIG. 5 is an example data structure or priority table 500 that stores a host priority table for use in assigning host priority among user devices 210-X identified in a service plan associated with a user. Priority table 500 may be any data structure and stored, for example, in database 440. Priority table 500 may include values input by the user (i.e., user preferences), default values, and/or values provided by a service provider (i.e., provider preferences).

As shown in FIG. 5, priority table 500 may include hosting priority information in entries in a number of different fields. For example, device ID field 510 may include entries that includes identification information associated with user devices 210-X under a service plan. The information may include device IDs, user-supplied device names, etc. Location field 520 may include entries that identify a location for accessing application services under the corresponding service plan. The locations may be a "name" given to places (e.g., "home," "office," etc.), a physical address, GPS coordinates. Additionally, or alternatively, location field 520 may identify a mode of travel (e.g., "vehicle"). Priority field 530 may include hosting priority ranking values associated with each of user devices 210-X identified in device ID field 510. The values may correspond to the relative performance attributes for each user device 210-X, for example, processing power, modem speed, type of communication link (e.g., 5G, 4G, fiber optic, cable, etc.), and/or other attributes. In one example, the hosting priority for a vehicle may be of the highest priority, regardless of the performance attributes associated with the vehicle's modem (e.g., TCU).

Although FIG. 5 shows exemplary field of priority table 500, in other implementations, priority table 500 may include fewer fields, different fields, additional fields, or differently arranged fields than depicted in FIG. 5.

Figure 6:
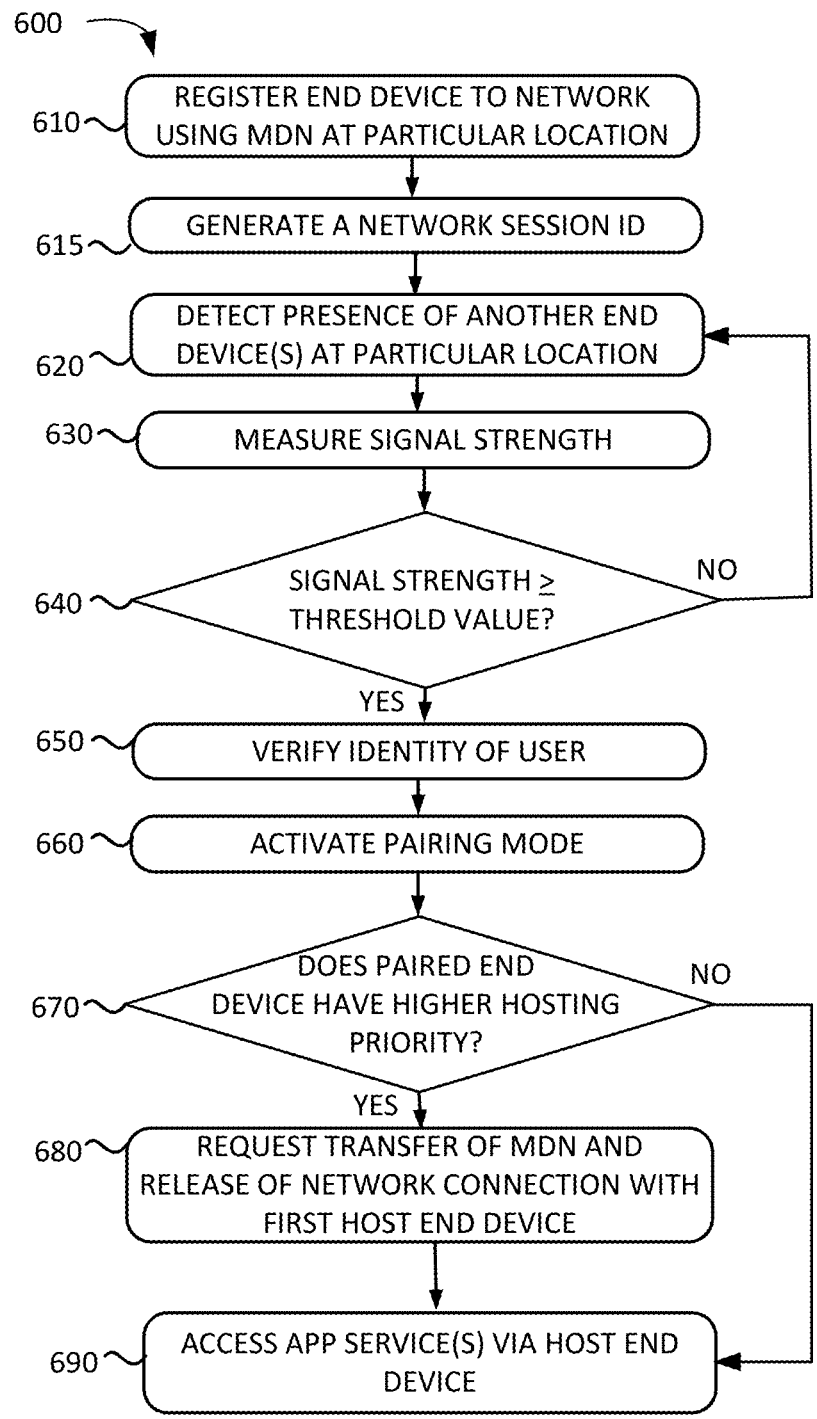
FIG. 6 is a flowchart of an example process for seamless service enablement and end device activation.

FIG. 6 is a flowchart of an example process 600 for seamless service enablement and/or endpoints activation for providing an endpoint interface for multiple paired end devices associated with a single MDN at a particular location. In one implementation, process 600 may be performed by a smart client of user devices 210. In another implementation, some or all of process 600 may be performed by a device or collection of devices separate from, or in combination with, the smart client of user devices 210, such as SSE server 150.

As shown in FIG. 6, process 600 may include registering user device 210-1 to a provider network using an MDN for a current location (block 610). Assume that a user of user device 210-1 is known to an application service associated with an app server 230. Assume further that the user desires to establish a network session with app server 230 via which one or more application services may be accessed. As shown in block 615, user device 210-1 may generate a dynamic network session ID, for example, of 6 to 32 bits (or other length) that identifies the verified user and may send a request to app server 230 to receive application services for a particular endpoint interface. The request may include a token that contains identity information associated with the user (e.g., username, password, personal identification number (PIN), etc.) and/or information associated with user device 210-1 (e.g., a device identifier as described above with respect to FIG. 2), and/or information associated with an application service (e.g., an application identifier) stored on user device 210-1. SSE server 150 may receive the request and forward the request to app server 230, to obtain SSE services regarding the network session associated with the user. The request may include a dynamic network session ID.

As also shown in FIG. 6, process 600 may include detecting the presence of another end device at the same location (block 620). For example, the smart client of user device 210-1 may determine that user device 210-M has been powered up or placed in proximity to user device 210-1. Upon detection, user device 210-1 may determine a signal strength, for example, in a short-range communication link (e.g., WiFi, Bluetooth®, NFC, etc.), associated with user device 210-M (block 630).

Process 600 may include determining whether the measured signal strength meets a threshold value for signal strength (e.g., an RSSI>70 decibel-milliwatts (dBm), or other value) (block 640). When the signal strength is below the threshold value (block 640—NO), user device 210-M will not be paired to user device 210-1, and process 600 will continue to scan for proximate user devices 210-M. When the signal strength is greater than or equal to the threshold value (block 640—YES), process 600 may include verifying an identity of the user of user device 210-M. For example, the smart client of user device 210-M may obtain multi-modal biometric information (e.g., e.g., retina scans, a voiceprint, a facial signature, fingerprints, etc.) and/or other personal identifying information, which the smart client of user device 210-1 may use to determine that the same user is operating user device 210-1 and user device 210-M (block 650). The smart client of user device 210-1 may compare the obtained user identification information to stored user identification information associated with the user.

Based on a determination the same user is using both user device 210-1 and user device 210-M at a particular location, the smart clients of user device 210-1 and user device 210-M may activate a pairing mode, for example, to establish a short-range communication link (block 660). Upon pairing, the smart client device of user device 210-1 may negotiate with the smart client of paired user device 210-M to determine whether paired user device 210-M has a hosting priority (e.g., in priority field 530) that is higher than user device 210-1 (block 670). For example, the smart device(s) may consult a routing table such as priority table 500 shown in FIG. 5. When paired user device 210-M has a lower hosting priority relative to host user device 210-1 (block 670—NO), host user device 210-1 may send an identifier (e.g., IMEI/EID Device ID/MSISDN/MDN, etc.) associated with paired user device 210-M to SSE server 150 and, under the corresponding service plan, paired user device 210-M may then access application services via host user device's 210-1 existing network connection (block 690).

When paired user device 210-M has a higher hosting priority relative to host user device 210-1 (block 670—YES), host user device 210-1 may send a request to SSE server 150 to paired user device 210-M, and release the existing network connection to user device 210-1 and transfer the MDN and/or use of the MDN (block 680). In this manner, hosting duties are transferred to user device 210-M, and user device 210-1 may access network resources via user device's 210-M network connection under the corresponding service plan (block 690).

Implementations described herein may include systems and/or methods that provide for SSE in an endpoint interface scenario. In one example implementation, an SSE application may register a host user device using a dynamic network session ID using a single MDN for multiple paired user devices.

In one exemplary implementation, the user may use the SSE application for accessing travel-related services. In this example, user may use one or more user devices 210 to reserve, pay for, and board transportation services such as ridesharing, mass transit, commercial flights, etc. Host user device 210-1 and/or paired user devices 210-M may be used to access aggregated travels services including providing valid identification of the user, keyless entry for vehicles and/or accommodations, a digital wallet for dining and purchases. The service provider may track the user's position and coordinate application services based on the tracked positioning.

In another example, the user may use the SSE application for consumer transactions such as retail. One or more of paired user devices 210-X may interface via host user device 210-1 with point-of-sale devices to itemize and total the user's purchase of items, for example, that are loaded in a cart via short-range communication such as WiFi, Bluetooth®, NFC, etc.

In another exemplary implementation, the SSE application may be used to switch between personal and business telephone lines on one user device. In other exemplary implementation, the SSE application may provide services for presenting a desktop display on multiple user devices. In yet another exemplary implementation, the SSE application may be used to provide health-related services to the user and healthcare providers. For example, one or more paired user devices may monitor one or more health conditions and an electronic medical history for the user that may be access by devices associated with the healthcare provider.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), and/or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:
1. A method comprising:
identifying, by a first end device at a first location, a user of the first end device based on first user identification information obtained from the user;
registering the first end device in a provider network based on first user credentials provided to the provider network, wherein the first end device has a first Subscriber Identification Module (SIM) profile associated with a mobile directory number (MDN) under a network service plan;
generating, by the first end device, a first network session identifier (ID) to access a first application service from a device in the provider network via a first network connection;
detecting, by the first end device, a second end device at the first location, wherein the second end device is associated with the network service plan;
initiating, by the first end device, a first pairing mode with the second end device;
identifying, by the first end device, the user based on second user identification information obtained from the user via the second end device;
determining, by the first end device, that the second end device has a higher hosting priority than the first end device based on the network service plan;

sending, by the first end device, a request to the device to transfer use of the MDN to the second end device, wherein the request includes a token associated with the second end device; and establishing, by the second end device, a second network connection to the device and releasing the first network connection based on the transfer.

2. The method of claim 1, further comprising:

generating, by the second end device, a second network session ID to access a second application service from the device via the second network connection, wherein the second network session ID is associated with second user credentials corresponding to a second SIM profile associated with the MDN; and accessing, by the second end device and based on the second network session ID, the second application service via the second network connection.

3. The method of claim 1, further comprising:

accessing, by the first end device, the first application service via the second network connection based on the first network session ID.

4. The method of claim 1, further comprising:

determining a signal strength associated with a short-range communication link between the first end device and the second end device; and comparing the signal strength to a threshold value.

5. The method of claim 1, wherein at least one of the first user identification information or the second user identification information comprises biometric data of the user.

6. The method of claim 5, further comprising:

accessing, by a third end device, the first application service via the second network connection, wherein the third end device has a lower hosting priority that the second end device based on the network service plan.

7. The method of claim 1, further comprising:

terminating, by the second end device, the first pairing mode based on a determination that a signal strength associated with a short-range communication link between the first end device and the second end device is below a threshold value; and terminating the first network session ID based on the terminated first pairing mode.

8. A first end device comprising:

a communication interface;

a memory for storing instructions; and a processor configured to execute the instructions to:

identify, at a first location, a user of the first end device based on first user identification information obtained from the user;

register, via the communication interface, the first end device with a provider network based on first user credentials provided to the provider network by the first client device, wherein the first end device has a first Subscriber Identification Module (SIM) profile associated with a mobile directory number (MDN) under a network service plan;

generate a first network session identifier (ID) to access a first application service from a device of the provider network via a first network connection;

detect a second end device at the first location, wherein the second end device is associated with the network service plan;

initiate a first pairing mode with the second end device;

identify the user based on second user identification information obtained from the user via the second end device;

determine that the second end device has a higher hosting priority than the first end device based on the network service plan;

send, via the communication interface, a request to the device to transfer use of the MDN to the second end device, wherein the request includes a token associated with the second end device; and release the first network connection based on the transfer.

9. The first end device of claim 8, wherein the first end device comprises a computing device that is not enabled with voice communications and is not assigned its own MDN.

10. The first end device of claim 8, wherein the processor is further configured to execute instructions to:

access, via the second end device, the first application service via a second network connection based on the first network session ID.

11. The first end device of claim 8, wherein the processor is further configured to:

determine a signal strength associated with a short-range communication link between the first end device and the second end device; and compare the signal strength to a threshold value.

12. The first end device of claim 11, wherein the signal strength comprises a Received Signal Strength Indication (RSSI) value.

13. The first end device of claim 8, wherein the first end device comprises a computing device that is not enabled with voice communications and is not assigned its own MDN.

14. The first end device of claim 13, wherein at least one of the first user identification information or the second user identification information comprises biometric data of the user.

15. A non-transitory computer-readable medium including instructions that, when executed by a processor of a first end device, cause the first end device to:

identify, at a first location, a user of the first end device based on first user identification information obtained from the user;

register the first end device in a provider network based on first user credentials provided to the provider network by the first end device, wherein the first end device has a first Subscriber Identification Module (SIM) profile associated with a mobile directory number (MDN) under a network service plan;

generate a first network session identifier (ID) to access a first application service from a device in the provider network via a first network connection;

detect a second end device at the first location, wherein the second end device is associated with the network service plan;

initiate a first pairing mode with a second end device;

identify the user based on second user identification information obtained from the user via the second end device;

determine that the second end device has a higher hosting priority than the first end device based on the network service plan;

send, via the communication interface, a request to the device to transfer use of the MDN to the second end device, wherein the request includes a token associated with the second end device; and release the first network connection based on the transfer.

16. The non-transitory computer-readable medium of claim 15, wherein the instructions further cause the processor of the first end device to:
   access, via the second end device, the first application service via a second network connection based on the first network session ID.

17. The non-transitory computer-readable medium of claim 15, wherein the instructions further cause the processor of the first end device to:
   determine a signal strength associated with a short-range communication link between the first end device and the second end device; and
   compare the signal strength to a threshold value.

18. The non-transitory computer-readable medium of claim 17, wherein the signal strength comprises a Received Signal Strength Indication (RSSI) value.

19. The non-transitory computer-readable medium of claim 15, wherein the first end device comprises a computing device that is not enabled with voice communications and is not assigned its own MDN.

20. The non-transitory computer-readable medium of claim 19, wherein at least one of the first user identification information or the second user identification information comprises biometric data of the user.

* * * * *